United States Patent
Janning

(10) Patent No.: US 8,736,182 B1
(45) Date of Patent: May 27, 2014

(54) FULL WAVE LOW FLICKER LED LIGHT STRING

(71) Applicant: JLJ, Inc., Bellbrook, OH (US)

(72) Inventor: John L. Janning, Bellbrook, OH (US)

(73) Assignee: JLJ, Inc., Bellbrook, OH (US)

( * ) Notice: Subject to any disclaimer, the term of this patent is extended or adjusted under 35 U.S.C. 154(b) by 0 days.

(21) Appl. No.: 14/026,685

(22) Filed: Sep. 13, 2013

Related U.S. Application Data

(60) Provisional application No. 61/863,864, filed on Aug. 8, 2013.

(51) Int. Cl.
*F21S 4/00* (2006.01)

(52) U.S. Cl.
USPC ...................................................... 315/185 S

(58) Field of Classification Search
USPC ....... 315/185 S, 185 R, 246, 205, 206, 200 R
See application file for complete search history.

(56) References Cited

U.S. PATENT DOCUMENTS

| | | | |
|---|---|---|---|
| 6,972,528 B2 | 12/2005 | Shao | |
| 7,609,006 B2 * | 10/2009 | Gibboney | 315/200 R |
| 7,649,322 B2 * | 1/2010 | Neuman et al. | 315/185 S |
| 8,072,152 B2 * | 12/2011 | Neuman et al. | 315/185 R |
| 2008/0116816 A1 * | 5/2008 | Neuman et al. | 315/185 S |
| 2009/0206762 A1 * | 8/2009 | Gibboney | 315/185 R |
| 2010/0096999 A1 * | 4/2010 | Neuman et al. | 315/185 R |
| 2012/0074854 A1 * | 3/2012 | Neuman et al. | 315/185 R |
| 2012/0111850 A1 * | 5/2012 | Casper | 219/420 |

* cited by examiner

*Primary Examiner* — Thienvu Tran
(74) *Attorney, Agent, or Firm* — Dickstein Shapiro LLP

(57) ABSTRACT

A split bridge circuit for rectifying the alternating current house supply into direct current (D.C.), using bi-polar transistor as rectifying devices. Using specified terminals of the bi-polar transistors results in a high forward voltage drop across the transistors (particularly as compared to the voltage drop across diode rectifiers in the prior art circuits), which reduces ripple significantly and lessens, or even eliminates, the need for a series limiting resistor in the circuit.

7 Claims, 3 Drawing Sheets

FULL WAVE LOW FLICKER LED LIGHT STRING

This application claims the benefit of U.S. Provisional Application No. 61/863,864, filed Aug. 8, 2013, the disclosure of which is herein incorporated by reference.

BACKGROUND OF THE INVENTION

Present day Christmas lighting and decorating is now done mostly by using light emitting diodes (LED's). LED light strings, with multiple LED's, are usually wired in electrical series and powered by rectified alternating current (A.C.). Some light strings are powered by half-wave rectification using a single rectifier diode while others are powered by full-wave rectified 120 volt A.C. yielding better brightness and less flicker. Since light emitting diodes are DC devices and emit light according to the voltage applied, any variation in voltage will cause a variation in brightness—thus flickering. This flicker is annoying to some people, even though at full-wave rectification it occurs 120 times per second.

To achieve low flicker in an LED light string, it is necessary to rectify the 120 volt A.C. supply voltage into D.C. (direct current) as ripple free as possible. This is usually done by using a full wave bridge rectifier circuit. However, for light strings with end-to-end connectors, this usually means four wires need to go "down the line". In U.S. Pat. No. 6,972,528, Shao teaches a circuit in which the full wave rectifier is split into two groups—one group of two rectifiers connected at the front end of the string and the other group of two rectifiers connected at the end of the light string, i.e., a split bridge circuit. In U.S. Pat. Nos. 7,649,322 and 8,072,152, Neuman et al., teaches a similar split bridge approach, but uses an LED in series with each rectifier diode in the split bridge structure.

SUMMARY OF THE INVENTION

The present invention provides a split bridge circuit for rectifying the alternating current house supply into direct current (D.C.) using bi-polar transistor as rectifying devices. Using specified terminals of the bi-polar transistors results in a high forward voltage drop across the transistors (particularly as compared to the voltage drop across diode rectifiers in the prior art circuits), which reduces ripple significantly and lessens, or even eliminates, the need for a series limiting resistor.

Other advantages, variations and other features of the invention will become apparent from the drawings, the further description of examples and the claims to follow.

DETAILED DESCRIPTION OF THE PREFERRED EMBODIMENTS

Figure 1:
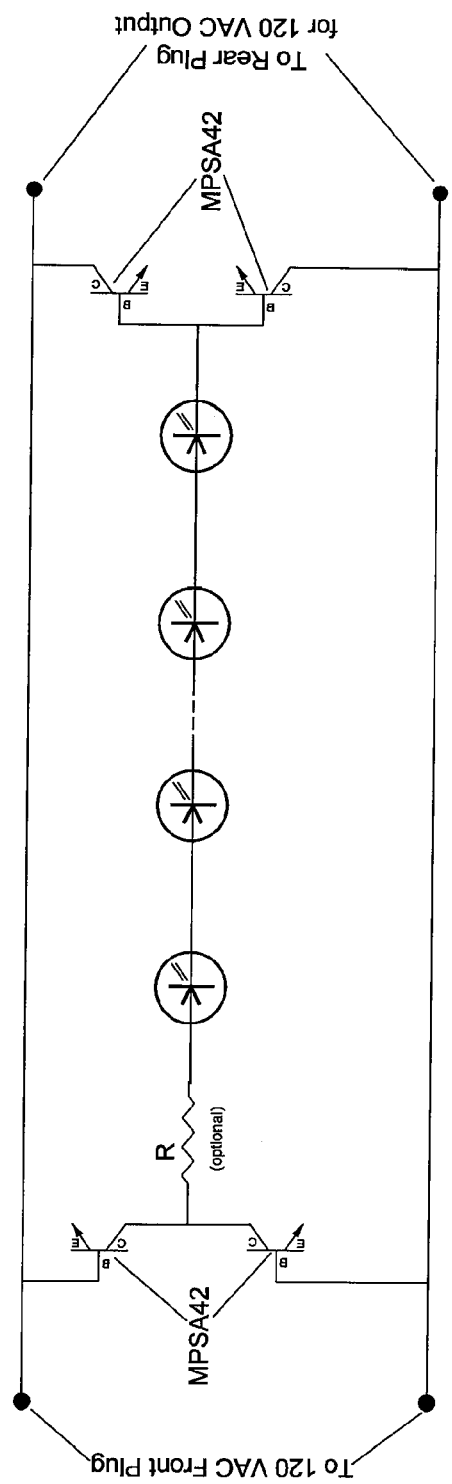
FIG. 1 shows the split bridge circuit of the present invention employing transistors, using the collector and base terminals of the transistors, with the emitter terminal of the transistors floating.

Referring first to FIG. 1, the split bridge circuit of the present invention is shown, employing transistors such as the MPSA42 or other low cost small signal transistors with a suitable Vcbo of 180 volts or more. The emitter terminal of the transistors float and do not get connected. Only the collector and base terminals are used. To avoid having to use an optional series resistor R, the number of light emitting diodes can be increased to 40 LED's connected in electrical series, in the light string. LED's used in Christmas light strings are usually rated at 20 milliamperes. With 40 LED's in the light string of FIG. 1, this works out nicely. As known to those skilled in the art, strings can be made in multiples of 40 LED's, such as 80 or 120 lights in the string.

The transistors at the front end of the light string can be mounted inside the front 120 VAC plug. Likewise, the transistors at the end of the light string can be mounted inside the rear plug.

Figure 2:
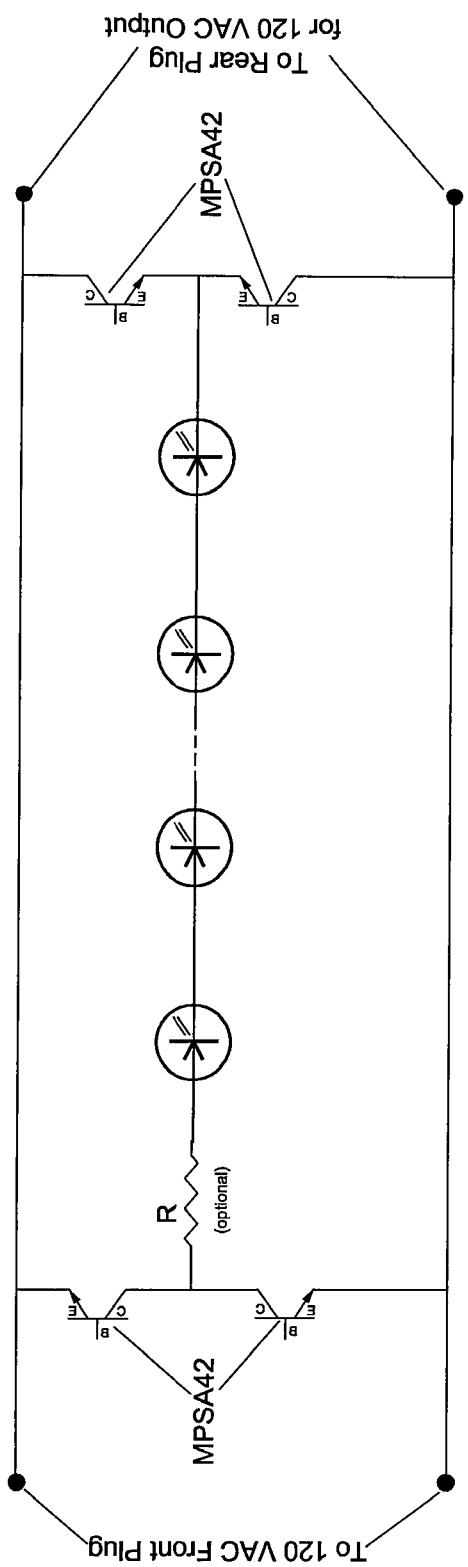
FIG. 2 shows the split bridge circuit of the present invention, with the emitter and collector terminals of the transistors connected in their opposite polarity direction with the base terminal of these transistors not connected.

Another split bridge circuit of the present invention for rectifying alternating current uses bi-polar junction transistors as rectifying devices with their base terminal not connected. This is shown in FIG. 2, where the emitter and collector terminals of the transistors are connected in their opposite polarity direction with the base terminal of these transistors not connected. Because the forward voltage drop of such rectifying devices with the base terminal floating is high at approximately about 6.5 volts,—compared to approximately 0.7 volts for the standard silicon rectifier diodes—and because in a bridge rectifier circuit, current travels through two devices in electrical series resulting in a total forward voltage drop of about 13 volts for transistors, as compared to about 1.4 volts for rectifier diodes, the ripple found in prior art circuits is virtually eliminated, and the optional resistor R may not be needed. Such a light string would employ 35 LED's wired in electrical series. As before, strings with multiples of 35 LED's can be made having 70 or 105 lights.

Figure 3:
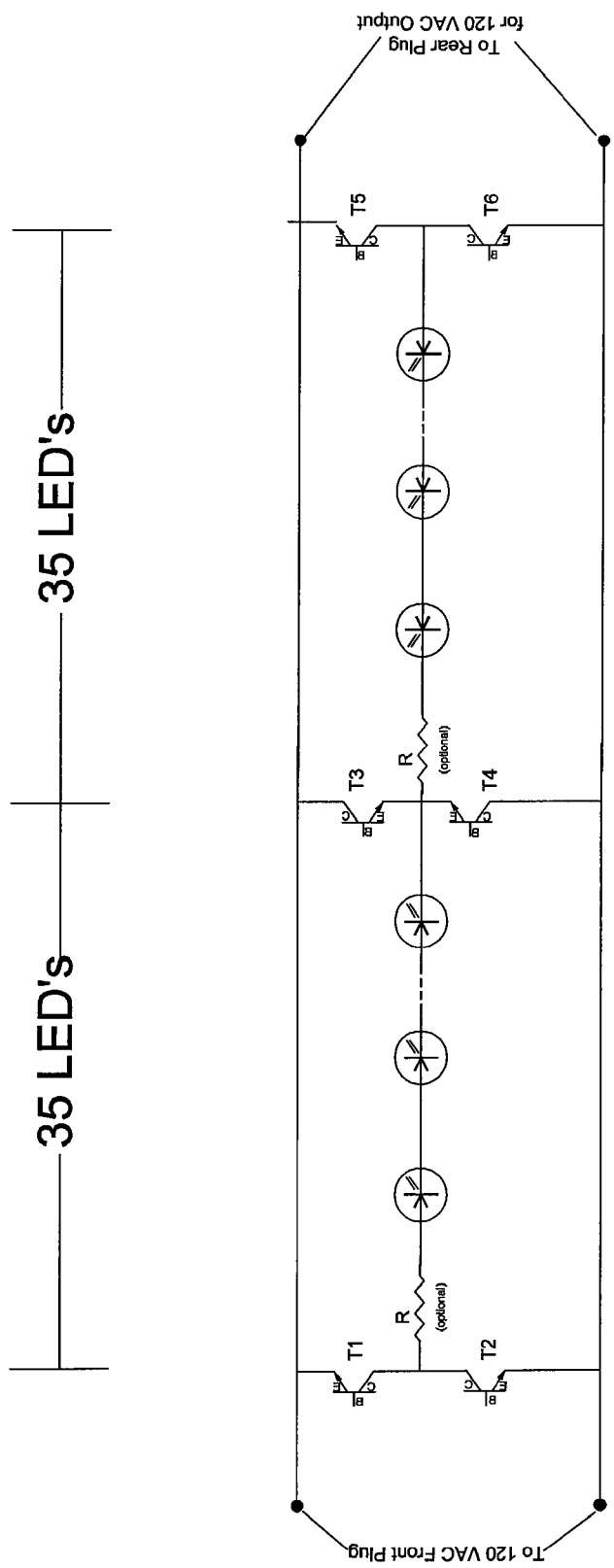
FIG. 3 shows an embodiment of the split bridge circuit of the present invention using a single pair of rectifying transistors in the center of the light string.

The circuit shown in FIG. 3 uses a single pair of rectifying transistors in the center of the light string. This single rectifying transistor pair is used in both halves of the light string to rectify alternating current.

As mentioned previously, the resistor R shown in the figures is optional. It may be necessary in some cases to provide a current limiting means and is therefore used.

Although the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention.

Accordingly, the invention is not limited by the foregoing description or drawings, but is only limited by the scope of the appended claims.

I claim:

1. A series wired light string comprising:
    (a) at least 30 light emitting diodes (LED's) connected in electrical series; and
    (b) a split bridge rectifying circuit for powering the series connected LED's, the split bridge rectifying circuit comprising:
        (i) a first half bridge rectifying circuit formed of two transistors as rectifying devices, using only the emitter and collector terminals of the transistors, with the base terminal not connected, and
        (ii) a second half bridge rectifying circuit formed of two transistors as rectifying devices, using only the emitter and collector terminals of the transistors, with the base terminal not connected;

wherein the series connected LED's are connected between the first and second halves of the bridge rectifying circuit, and wherein the first half bridge rectifying circuit is connected to a first AC plug and the second half bridge rectifying circuit is connected to a second AC plug.

2. The light string of claim 1, comprising 40 LED's connected in electrical series.

3. The light string of claim 1, where 35 LED's are connected in electrical series and an optional series resistance of approximately 750 ohms is included in the series light string.

4. The light string of claim 1, where the two transistors of the first half bridge rectifying circuit are mounted inside first AC plug and the two rectifying transistors of the second half bridge rectifying circuit are mounted inside the second AC plug.

5. The light string of claim 1, wherein the transistors of the first and second split bridge rectifying circuits have a Vcbo of at least 180 volts.

6. The light string of claim 1, wherein the transistors of the first and second split bridge rectifying circuits are bi-polar junction transistors.

7. The light string of claim 1, further comprising a third pair of rectifying transistors disposed in the middle of the light string, using only the emitter and collector terminals of the third pair of transistors, with the base terminal not connected.

* * * * *